(12) United States Patent
Roever

(10) Patent No.: US 7,457,894 B2
(45) Date of Patent: Nov. 25, 2008

(54) SYNCHRONIZATION OF NON-SEQUENTIAL MOVING POINTERS

(75) Inventor: Jens Roever, Cupertino, CA (US)

(73) Assignee: NXP B.V., Eindhoven (NL)

( * ) Notice: Subject to any disclaimer, the term of this patent is extended or adjusted under 35 U.S.C. 154(b) by 53 days.

(21) Appl. No.: 09/941,478

(22) Filed: Aug. 29, 2001

(65) Prior Publication Data

US 2003/0046498 A1 Mar. 6, 2003

(51) Int. Cl.
*G06F 12/02* (2006.01)

(52) U.S. Cl. .............................. 710/56; 711/1; 711/150; 711/163; 711/218; 710/52

(58) Field of Classification Search ................ 711/154, 711/218

See application file for complete search history.

(56) References Cited

U.S. PATENT DOCUMENTS

| | | | | |
|---|---|---|---|---|
| 5,974,516 A * | 10/1999 | Qureshi | ...................... | 711/171 |
| 6,145,061 A * | 11/2000 | Garcia et al. | ................ | 711/154 |
| 6,553,448 B1 * | 4/2003 | Mannion | ........................ | 711/2 |
| 6,587,112 B1 * | 7/2003 | Goeltzenleuchter et al. | . | 345/532 |
| 6,625,440 B1 * | 9/2003 | Shaler et al. | ................ | 455/514 |
| 6,772,280 B1 * | 8/2004 | Kamijo | ........................ | 711/110 |
| 6,977,948 B1 * | 12/2005 | Chennubhotla et al. | ..... | 370/516 |

FOREIGN PATENT DOCUMENTS

EP 0999495 A 5/2000

* cited by examiner

*Primary Examiner*—B. James Peikari

(57) ABSTRACT

A hierarchical memory access control distinguishes between blocks of data that are known to be sequentially accessed, and the contents of each block, which may or may not be sequentially accessed. If the contents of a block are provided in a sequential manner within the block, but the sequence does not correspond to a higher-level sequence, due to a non-zero offset in the start of the sequence within the block, the memory access control is configured to optimize the use of available memory by signaling when the within-block sequence corresponds to the higher-level sequence. While the within-block sequence differs from the higher-level sequence, access to the buffer is limited to the higher-level partitioning of the buffer. When the within-block sequence corresponds to the higher-level sequence, access to the buffer is provided at the within-block partitioning of the buffer. In this manner, dependent upon the degree of offset of the within-block sequence relative to the higher-level sequence, access to the buffer is often provided well before the entire block is provided to the buffer, thereby optimizing the speed at which the memory can be accessed.

8 Claims, 2 Drawing Sheets

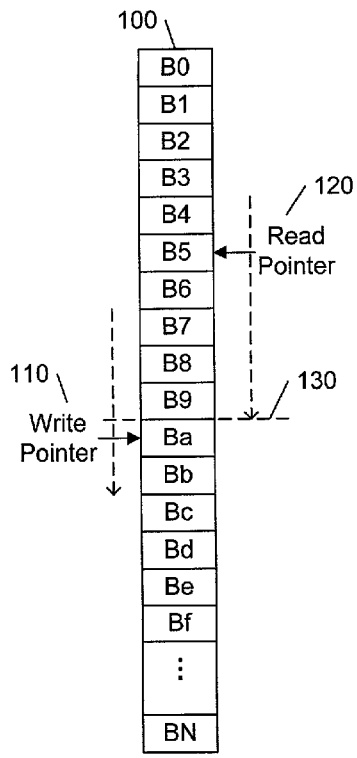
FIG. 1 [Prior Art]
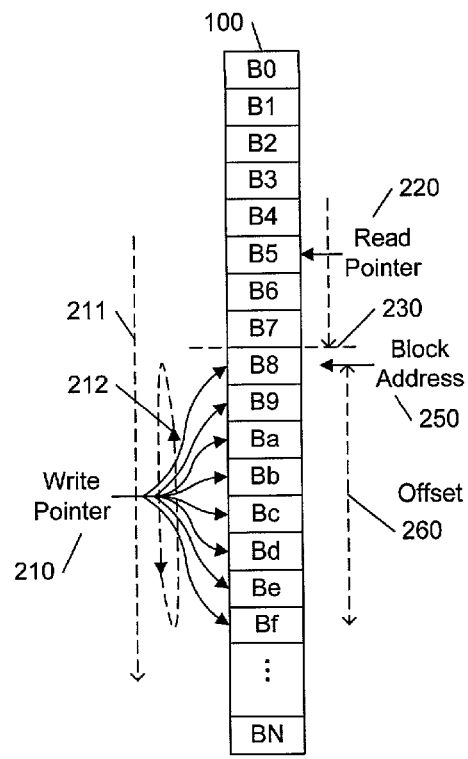
FIG. 2
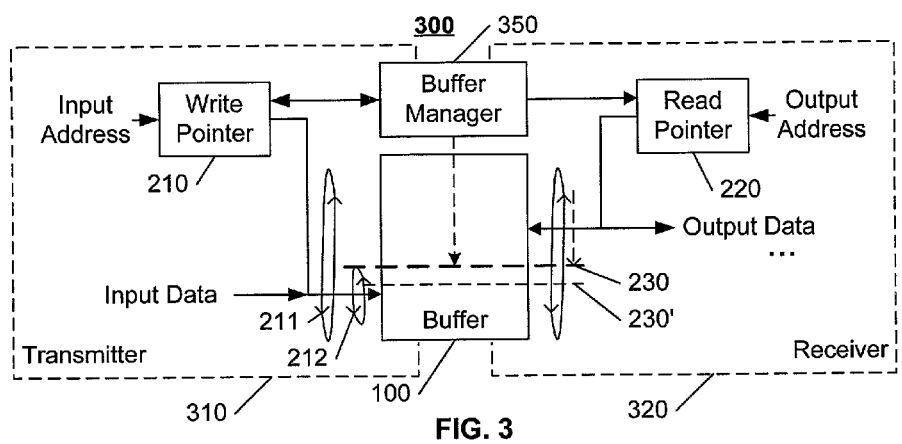
FIG. 3

SYNCHRONIZATION OF NON-SEQUENTIAL MOVING POINTERS

BACKGROUND OF THE INVENTION

1. Field of the Invention

This invention relates to the field of processing and/or communications, and in particular to the control of a buffer for interfacing between two systems, one of which is configured to access the buffer in a non-sequential manner.

2. Description of Related Art

Buffers are commonly used to interface between systems, particularly systems that transfer data asynchronously. Such a data transfer buffer is generally configured to receive data, either synchronously or asynchronously, from a first system, and to provide it to a second system, on demand from the second system. A buffer manager is used to assure that the data is received from the first system before a corresponding data item is provided to the second system. That is, the buffer manager regulates the speed at which a receiver can receive data to a corresponding speed of a transmitter that is sending the data.

FIG. 1 illustrates an example buffer 100 that is configured to store each data item from a transmitting system, at a location indicated by a write pointer 110. As each data item is stored, the write pointer 110 is incremented, to indicate the location to store the next data item. Data is provided to a receiving system by initializing a read pointer 120 to be equal to the write pointer 110, and then sequentially providing each data item to the receiving system upon request. As each data item is provided to the receiving system, the read pointer 120 is incremented, to indicate the location of the next available data item. To assure that the read pointer 120 does not point to a location that has not yet been written to, the read pointer 120 is constrained to not exceed a limit 130. This limit is continually adjusted as the data items are stored in the buffer 100, and conventionally corresponds to the write pointer 110. For ease of reference and understanding, the limit 130 is discussed hereinafter as a specific parameter, even though it may be the same parameter as the write pointer 110.

The limit 130 is enforced either by a memory access controller, or directly by the receiving system. That is, commonly the limit 130 is made available by the memory access controller, and it is the receiving system's responsibility to maintain the read pointer 120 and to assure that it does not "track" beyond the limit 130.

Generally, the buffer 100 is finite in size, and substantially smaller than the total number of data items that may be received by the buffer 100. To allow for continued use of the buffer, the buffer is generally configured to be "circular", such that when a pointer reaches the end of the buffer, it is reset to the beginning of the buffer. Algorithms are commonly available for enforcing the aforementioned limit 130 within a circular buffer. Depending upon the particular embodiment, the write pointer 110 may also be constrained so as not to track beyond a limit corresponding to the read pointer 120 after it loops around the circular buffer. That is, the transmitting system will be prevented from storing data into the buffer 100 if the prior data has not yet been read by the receiving system. Alternatively, the read pointer 120 can be forced to advance, to keep ahead of the write pointer as new data arrives, the unread data being overwritten by the newly arriving data. For ease of reference and understanding, the invention is presented hereinafter with regard to the enforcement of a limit on the read pointer, the enforcement of a limit on the write pointer 110 being substantially equivalent.

The size of the buffer 100 determines the allowable mismatch between the speed of writing and reading to and from the buffer, and/or in the case of an uncontrolled transmitter, the size of the buffer 100 determines the amount of data lost due to a mis-match of speeds between the transmitter and the receiver. In the case of a controlled transmitter, the buffer 100 serves to enforce an equalization of the average transmit and receive data rates, and the size of the buffer 100 determines the degree of variance allowed about this average data rate.

As noted above, the system that provides the data to the buffer 100, and the system that receives the data from the buffer 100 are asynchronous. The updating of the limit 130, therefore, can only be synchronous with one or the other system. To assure that the pointers or limit are not misread as they are incremented, the pointers are commonly encoded and incremented using a gray-code, wherein only one bit of the pointer changes during an incremental transition. In this manner, an asynchronous read of the limit 130 at the time of transition of the limit 130 will either provide the prior value or the next value of the limit 130. Because enforcement of the prior value of the limit 130 will still prevent the read pointer 120 from tracking beyond the write pointer 110, the use of a gray-code sequence assures the integrity of the read process, regardless of when the limit 130 is read.

This conventional two-port (data-in, data-out) buffer scheme for asynchronous read and write access assumes as a basic premise that the writing of data to the buffer 100 is sequential. That is, it is inherently assumed that all of the memory locations between the read pointer 120 and the limit 130 contain valid data. In some applications, discussed further below, data may be more efficiently made available for writing to a buffer in a somewhat non-sequential manner.

BRIEF SUMMARY OF THE INVENTION

It is an object of this invention to provide a memory access method and apparatus that allows for non-sequential access to a memory device, such as a buffer. It is a further object of this invention to provide a memory access method and apparatus that optimizes the use of available memory.

These objects, and others, are achieved by providing a hierarchical memory access control method and system. This hierarchical memory access control distinguishes between blocks of data that are known to be sequentially accessed and the contents of each block, which may or may not be sequentially accessed. If the contents of a block are provided in a sequential manner within the block, but the sequence does not correspond to a higher-level sequence, due to a non-zero offset in the start of the sequence within the block, the memory access control is configured to optimize the use of available memory by signaling when the within-block sequence corresponds to the higher-level sequence. While the within-block sequence differs from the higher-level sequence, access to the buffer is limited to the higher-level partitioning of the buffer. When the within-block sequence corresponds to the higher-level sequence, access to the buffer is provided at the within-block partitioning of the buffer. In this manner, dependent upon the degree of offset of the within-block sequence relative to the higher-level sequence, access to the buffer is often provided well before the entire block is provided to the buffer, thereby optimizing the speed at which the memory can be accessed.

BRIEF DESCRIPTION OF THE DRAWINGS

The invention is explained in further detail, and by way of example, with reference to the accompanying drawings wherein:

FIG. 1 illustrates an example prior art buffer system with sequential read and write pointers.

FIG. 2 illustrates an example buffer system with a non-sequential access pointer in accordance with this invention.

FIG. 3 illustrates an example block diagram of a buffer management system in accordance with this invention.

Throughout the drawings, the same reference numerals indicate similar or corresponding features or functions.

DETAILED DESCRIPTION OF THE INVENTION

Figure 4:
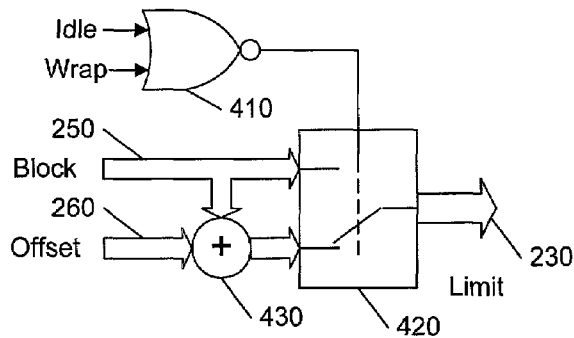
FIG. 4 illustrates an example logic diagram for determining a memory access limit of a buffer management system in accordance with this invention.

In a number of applications, apparently sequential data is stored in a hierarchical fashion, wherein individual data items are logically or physically partitioned into blocks. For example, MPEG encoded images are stored as a series of 8×8 pixel blocks that form an image; n-dimension data arrays stored as a sequence of one-dimension array blocks; and so on.

This block partitioning of information provides opportunities for reducing the complexity of buffer management. For example, when a block of data is to be transferred from one component to another via a buffer, the buffer management can be performed at the block level, rather than at the data level. That is, for example, when a block of data is being written, the buffer manager need merely set the limit 130 of FIG. 1 to the beginning of the block until the entire block is transferred, thereby avoiding the need to synchronize the read and write pointers while the block is being transferred.

In addition to simplifying the synchronization of read and write pointers, providing a block level buffer management allows the within-block read or write operations to be nonsequential. That is, because the read access is not permitted into the block while the block is being written, the write-process can place the data within the block in any order, without concern that the read-process will read a mix of old and new data within the block. In like manner, if the read-process is accessing a block, the write-process is precluded from modifying any of the data items within the block.

By managing buffer access at the block level, the within-block read and write accesses can be optimized for the particular process that is used for data transfer, without constraining this optimization to a sequential transfer, as in the prior art of FIG. 1.

The optimization of data access is particularly significant for applications involving access to data in a high-speed pipeline data process, or other multiple access processes. A data access to high-speed memory is often performed by pre-charging the data-read lines in a bank of memory, and then driving the appropriate output device, based on the value of the data being read. Preferably, the pre-charge process occurs before the time that the read request arrives, so that the read request does not incur a delay while the pre-charge occurs. If a particular bank of memory is accessed in one memory-access cycle, the next cycle is preferably used for pre-charge.

One method of avoiding access to the same bank twice in succession is to offset the starting address of a sequence of accesses within a block, as required. For example, an MPEG macroblock corresponds to an 8×8 block of pixels, and a common memory structure used in video processing is a set of 8 banks, wherein each bank is 8 pixels wide. That is, the data in each 8-pixel-wide line-segment of the 8-line-segment macroblock is contained in a different bank. Accessing each line-segment, therefore, avoids the aforementioned pre-charge delay. However, if multiple parallel access to the banks is provided, these multiple accesses may result in a sequential access to the same memory bank. By allowing for a modification to the order in which line-segments within a block are accessed, repeated accesses to the same memory bank can be avoided. That is, for example, if one process is currently accessing bank-1 when another processes commences an access to the block, the other process can be configured to access the eight banks in a 7-8-1-2-3-4-5-6 order, instead of the conventional 1-2-3-4-5-6-7-8 order, which would incur the precharge delay.

FIG. 2 illustrates an example buffer system with a non-sequential within-block access pointer in accordance with this invention. As illustrated by the multiple arrows flowing from the write pointer 210, the write pointer 210 in this invention is configured to be able to point to any one of a plurality, or block, of memory elements (B8, B9, ... ) in the buffer 100. This example is presented to be consistent with the above example line-segment access scenario, wherein a block of eight line-segments is being accessed. Using this example, memory element B8 is configured to store eight pixel values corresponding to the first line-segment, memory element B9 is configured to store eight pixel values corresponding to the second line-segment, and so on. When, in the above example, the data for the eighth line-segment is extracted first, the write pointer 210 merely points to the memory element Bf that is configured to store the eight pixel values corresponding to the eighth line-segment. When, subsequently, the data for the first line-segment is extracted, the write pointer 210 points to memory element B8, and so on, until each of the eight sets of eight pixel values are loaded into the memory elements B8-Bf.

It is to be noted that, although the memory access within the block B8-Bf may be non-sequential, or sequential using a non-zero offset to the block, the memory access at the block level, from the first 8×8 block, to the second 8×8 block, and so on, is sequential, as indicated by the arrow 211 in FIG. 3. Therefore, the aforementioned enforcement of a reliable dual-access process, based on a sequential limit parameter, can be effected at the block level, even though it may not be applicable at the within-block level.

In accordance with one aspect of this invention, a limit 230 is configured to be set to the beginning of the block of memory elements B8-Bf, to prevent the read pointer 220 from extending into the block B8-Bf until each of the memory elements with the block is loaded with the appropriate data, in whatever order the write pointer 210 provides the data within this block.

Upon completion of this block transfer, the write pointer 210 is advanced to the next block of eight memory elements, and the limit 230 is set to the end of the block B8-Bf. Thereafter, the read pointer 220 is able to advance into the block B8-Bf to allow the transfer of the data to the example encoder. In this manner, by controlling the limit parameter 230 at the block level, a reliable buffer access can be provided.

Note that, although the above description presents a technique for controlling a read access at a block level during a non-sequential write access within a block, this same process can be effected for controlling a write access at a block level during a non-sequential read from the buffer 100. For example, the read pointer 220 may be configured to read the eighth memory element first, to store the values into a line buffer that contains other values of the eighth line-segment, similar to the aforementioned non-sequential write access to the buffer 100. In this example, the write pointer 210 will be limited so as not to extend into the particular block until each of the eight memory elements are read. As noted above, for ease of reference and understanding, the invention is presented using the paradigm of a non-sequential write access to a buffer, although the application of the principles disclosed herein to other non-sequential accesses to the buffer will be evident to one of ordinary skill in the art in view of this disclosure.

FIG. 3 illustrates an example block diagram of a buffer management system 300 in accordance with this invention. As illustrated, the buffer management system 300 manages the transfer of data from a transmitter device or component 310 to a receiver device or component 320. In accordance with this invention, a buffer manager 350 determines a limit 230 for read access, based on a block-level sequential write access. Depending upon the particular protocol used for read access, the buffer manager 350 either enforces the limit 230, by denying access to memory elements beyond the limit 230, or communicates the limit 230 to the receiver device 320 for a self-enforcement of the limit 230. The circular arrow 212 of FIGS. 2 and 3 are intended to illustrate the within-block memory accesses, which may or may not be sequential, whereas the circular arrow 211 illustrates the sequential block-to-block memory accesses. In accordance with a first aspect of this invention, the buffer manager 350 determines the limit 230 so as to prevent the read pointer 220 from extending into a block while the potentially non-sequential within-block accesses 212 are in process.

In accordance with a second aspect of this invention, the performance of the system 300 is further enhanced by determining when the sequencing of the memory access corresponds to the higher level sequencing order. Consider an example memory access wherein the sequence direction changes with each next block access, first via an increasing address sequence, then via a decreasing address sequence. Assuming an increasing address sequence during the read process, the buffer manager 350 is preferably configured to prevent the read pointer 220 from extending into the block while the block is being written to in a decreasing address order, but to allow the read pointer 220 to extend into the block while the block is being written to in an increasing address order, because the write sequence in the same direction as the higher level read sequencing. In this manner, the read pointer 220 is only delayed for half the block accesses, while the within-block write process is opposite the direction of the higher level read sequencing.

Consider also, the aforementioned sequential access with an initial non-zero within-block offset, such as a sequence 7-8-1-2-3-4-5-6. In this example, assuming that the conventional higher-level sequential access is from low-to-high address, the within-block sequential access occurs in the same direction as the block sequencing, i.e. from low-to-high, with a circular reset to the first item, after the last item is accessed. When the write pointer 210 is initially advanced to "8", memory access via the read pointer 220 must be excluded from within the block, because at least some of the memory locations below the eighth data item have not yet been written to. However, when the write pointer 210 is advanced to "2", a read pointer can be allowed to access the data item stored while the write pointer was at "1". Similarly, when the write pointer 210 is advanced to "4", the read pointer 220 can be allowed to access any of the items 1, 2, and 3, without fear of reading a value from a memory location that has not yet been written to.

In accordance with this invention, the buffer manager 350 is configured to maintain the limit 230 while any element 'below' the written-to memory element has not yet been written to (i.e. is not yet 'valid'), and to reset the limit 230 to a value 230' that corresponds to a memory element below which each other element is valid. In this manner, as soon as the within-block write pointer is consistent with the block level sequencing, read access can commence. In this context, 'below' is defined to mean a memory element prior to the subject element in the direction of the block level sequencing. That is, if the block level sequencing is from low-to-high, a 'below' memory element has a lower address, or index, than the subject element; whereas, if the block-level sequencing is from high-to-low, a 'below' memory element has a higher address, or index, than the subject element.

Any of a variety of techniques may be employed to determine when all of the below memory elements are valid. In a preferred embodiment, as illustrated in FIG. 2, the write pointer 210 corresponds to an offset 260 relative to a block address 250. If the sequencing of the within-block sequence is in the same direction (high-to-low or low-to-high) as the block-to-block sequence, then, once the offset 260 equals zero, all subsequent write pointer 210 accesses within the block at address 250 will be such that all 'below' memory elements will have been previously accessed, and therefore valid.

Note that in the above example, a fixed block size is used, for ease of reference. As would be evident to one of ordinary skill in the art, the only parameters required to effect the aforementioned process are the start of the block, and the end of the block (or, equivalently, the size of the block). Additionally, the size of a block may vary with each transaction.

Figure 5:
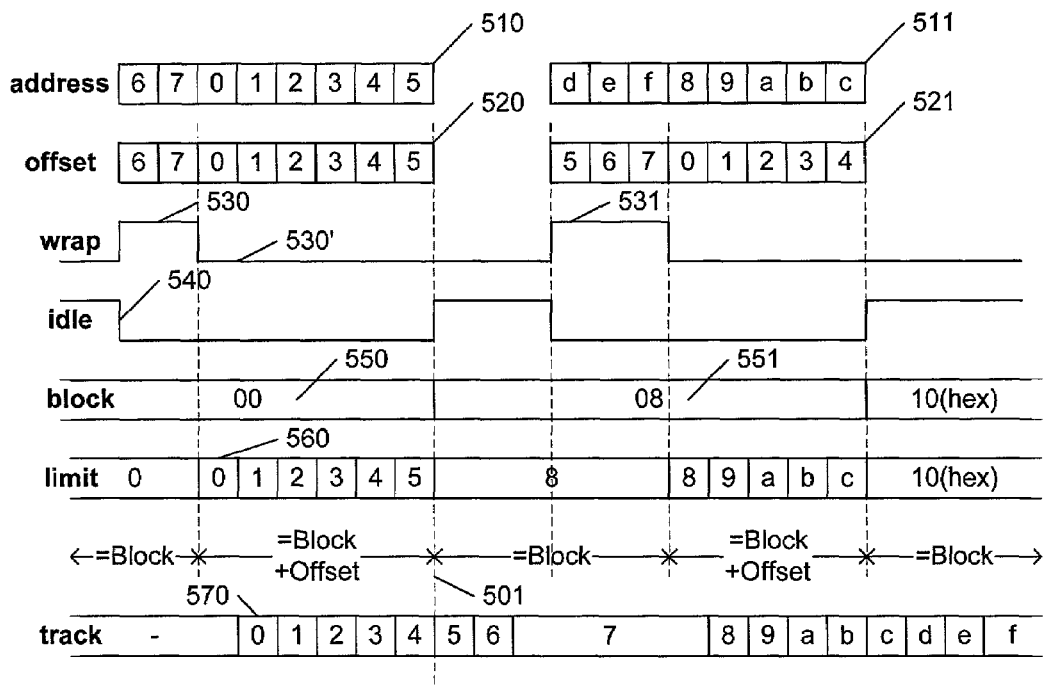
FIG. 5 illustrates an example timing diagram for tracking memory access in accordance with this invention.

FIG. 4 illustrates an example logic diagram for determining a memory access limit of a buffer management system in accordance with a preferred embodiment of this invention, and FIG. 5 illustrates an example timing diagram for tracking memory access corresponding to the logic of FIG. 4. In this example embodiment, a "wrap" signal indicates when the write pointer 210 (of FIG. 2) is initially offset, such that one or more 'lower' memory elements with the block at address 250 have been skipped over, and have not yet been written to. An "idle" signal indicates a non-write condition (in the alternative, wherein the read pointer is offset, the "idle" signal indicates a non-read condition).

When either the wrap signal or the idle signal is asserted, the NOR gate 410 selects the block address 250 to form the limit 230, via the selector 420. When neither the wrap signal nor the idle signal are asserted, the NOR gate 410 selects the sum 430 of the block address 250 and the offset 260 to form the limit 230. That is, when the currently active write pointer 210 is such that all the 'below' addresses have not been skipped over, the limit parameter 230 is set to correspond to this write pointer 210. (In this example embodiment, the read pointer 220 will be limited to be 'below' the limit 230, using the above definition of 'below').

FIG. 5 illustrates an example timing diagram for tracking memory access corresponding to the logic of FIG. 4. In this example, two block operations are illustrated, a block 510 comprising addresses 0 through 7, and a block 511 comprising addresses 8 through f (hexadecimal). The first block 510 is accessed at address "6" initially, and thereafter sequenced through address 7, then reset to address 0, then addresses 1-5. The second block 511 is accessed at address "d" initially, and thereafter sequenced through addresses e and f, then reset to 8, then addresses 9, a, b, and c. For convenience, the offset value and block value corresponding to the pointer addresses 510, 511 are illustrated at 520, 521 and 550, 551 respectively.

As illustrated in this example, by starting the second block 511 at address "d", the first offset value (5) in the second block 511 is the same as the last offset value in the first block 510. If, as discussed above, each new offset value requires a memory access operation or other time consuming operation, such as a read of a line of data into a line buffer, the sequence illustrated in FIG. 5 eliminates one such operation per block access, by retaining the prior offset value.

While the first block 510 is accessed at addresses 6, and 7, the buffer manager (350 in FIG. 3) asserts the wrap signal 530, thereby setting the limit 560 to the block address 550. When the wrap signal is deasserted 530', indicating that the within-block sequencing corresponds to the block level sequencing, the limit 560 is set to correspond to the address 510, which is the combination of the block address 550 and the offset 520. Similarly, while the second block 511 is accessed at addresses d, e, and f, the limit 560 is set to the block address 551, and thereafter set to the combination of the block address 551 and offset 521.

In a preferred embodiment of this invention, communication of the limit 560 is via a gray-code sequence, so that if the receiving system reads the limit during a transition, it will either be the value just before the transition, or just after the transition, as discussed above with regard to the conventional use of a gray-code sequence. A track signal 570 is provided to communicate the limit 560 to the receiving system, to track a write pointer that corresponds to block address 510. Only after the write pointer advances to address "1" is the read pointer allowed to advance to address "0"; thereafter, the track signal sequentially tracks through addresses 1-7. Note that, by providing a complete sequence in the track signal 570, without the gaps or jumps corresponding to the actual limit 560, a gray-code sequence corresponding to the tracking signal provides a reliable communication of the limit to the receiving system. That is, for example, at time 501, the limit 560 is actually 8, indicating that the receiving system can access any of the values 0-7. However, prior to time 501, the limit is 5. A change of the limit from 5 to 8 cannot reliably be communicated, because the receiver might attempt to read the limit while the value of the limit is changing. Gray-code sequencing provides this reliability, but only if the sequence is continuous. The track signal 570 provides this continuous sequence, without gaps or jumps in the sequence.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A buffer management system for controlling access of a first buffer operation and a second buffer operation to a shared buffer to prevent overwriting of data not yet read or reading of locations to which valid data has not yet been written, comprising
    a buffer manager that is configured to assert a wrap signal in response to a condition in which the first buffer operation involves consecutively accessing each buffer location of a block of buffer locations assigned sequential address values in an order different than an order defined by the sequential address values, and to de-assert the wrap signal in response to a condition in which the first buffer operation involves consecutively accessing each buffer location of a block of buffer locations assigned sequential address values in an order the same as an order defined by the sequential address values, and is further configured to limit accesses to the buffer of the second buffer operation when the wrap signal is asserted.

2. The buffer management system of claim 1, wherein
    the first buffer operation includes an access that is based on a block address and an offset address, and
    the second buffer operation is limited to the block address when the wrap signal is asserted, and is limited to a combination of the block address and the offset address when the wrap signal is deasserted.

3. The buffer management system of claim 2, wherein
    a change of limit of the second buffer operation is communicated via a gray-code sequence.

4. The buffer management system of claim 2, wherein
    the buffer manager is further configured to assert an idle signal when the first buffer operation terminates, and
    the second buffer operation is further limited to the block address when the idle signal is asserted.

5. The buffer management system of claim 1, wherein
    the first and the second buffer operations correspond to, respectively:
    a series of write-accesses to the buffer, and
    a series of read-accesses to the buffer.

6. A method of controlling access of a first buffer operation and a second buffer operation to a shared buffer to prevent overwriting of data not yet read or reading of locations to which valid data has not yet been written comprising:
    determining a block address and an offset address corresponding to the first buffer operation involving consecutively accessing each buffer location of a block of buffer locations assigned sequential block address values,
    determining when the offset address is non-sequential relative to the block address wherein the buffer locations are accessed in an order different than an order defined by the sequential address values,
    determining when the offset address is sequential relative to the block address wherein the buffer locations are accessed in an order the same as an order defined by the sequential address values,
    disallowing access of the second buffer operation to locations within the block when the offset address is non-sequential; and
    allowing access of the second buffer operation to locations within the block when the offset address is sequential.

7. The method of claim 6, further including:
    determining when the offset address is sequential relative to the block address, and
    limiting accesses of the second buffer operation to a combination of the block address and the offset address when the offset address is sequential.

8. The method of claim 6, wherein
    limiting the second buffer operation includes determining a gray-code sequence corresponding to a change in the block address.

* * * * *